United States Patent
Bolton et al.

(10) Patent No.: US 7,994,275 B1
(45) Date of Patent: Aug. 9, 2011

(54) METHOD FOR EXTRUDING POLYMERS

(75) Inventors: Nelson Bolton, Trumbauersville, PA (US); Edwin Bolton, Trumbauersville, PA (US); W. Novis Smith, Philadelphia, PA (US); Elizabeth Wimmer, Palm, PA (US)

(73) Assignee: AGP Plastics, Inc.

( * ) Notice: Subject to any disclaimer, the term of this patent is extended or adjusted under 35 U.S.C. 154(b) by 6 days.

(21) Appl. No.: 12/590,705

(22) Filed: Nov. 12, 2009

(51) Int. Cl.
*C08G 64/00* (2006.01)
*C08G 63/02* (2006.01)

(52) U.S. Cl. ............... 528/503; 264/176.1; 264/219; 525/85

(58) Field of Classification Search ............... 264/176.1, 264/219; 525/85
See application file for complete search history.

(56) References Cited

U.S. PATENT DOCUMENTS 5,468,803 A * 11/1995 Takahashi et al. ............ 524/553
* cited by examiner

*Primary Examiner* — Terressa M Boykin
(74) *Attorney, Agent, or Firm* — John Lezdey

(57) ABSTRACT

The disclosure defined by this invention provides a method for extruding thermoplastic polymers which includes the step of creating high pressure steam in the extruding apparatus so as to prevent scorching and to solubilize contaminants. The method can be used in a neutralization step of ionomers in an extrusion process to obtain an extrudate having good light transmission and improved impact resistance.

20 Claims, 1 Drawing Sheet

METHOD FOR EXTRUDING POLYMERS

FIELD OF THE INVENTION

The present invention relates to an improvement in the extrusion of thermoplastic polymers having a melting point less than 300° F. More particularly the invention relates to the extrusion of polyolefin/acrylic or methacrylic copolymers and terpolymers by the injection of water or aqueous solutions during extrusion to create high pressure steam in the extruder.

BACKGROUND OF THE INVENTION

In the extrusion of thermoplastic polymers the extrusion apparatus can develop hotspots which may cause scorching of the polymer. The scorching is a problem when the extruded polymer is to be used for its light transmission and clarity.

In the extrusion of ionomers, some of the ionomers are neutralized and/or cross-linked with alkali metal hydroxides during the extrusion process. In some instances there is incomplete dissolution of the additive in the polymer while in the extruder so as to result in the formation of haze in the extruded product. This can cause a problem for polymers which are extruded into sheet form and rely on clarity.

Such sheets are used for laminating for windshield and security glass. It is desirable that the thermoplastic polymers which are used for glazing be haze free and have good optical transmission.

With reference to ionomers, the neutralization or conversion of ethylene/acrylic acid and ethylene/methacrylic acid or methacrylic copolymers to their salts (sodium, potassium, lithium, magnesium or zinc) converts the un-neutralized copolymer ionomer from a tacky polymer with a high melt index and low impact resistance to a relative stiff thermoplastic with high impact resistance. Usually this neutralization or conversion of the free acid groups is converted from 20 to 75% with the preferable range of acid group conversion being 25-50% depending on the particular salt and copolymer involved. This conversion to the partially neutralized or even fully neutralized ionomer is critical to achieving the high impact laminating resins used for laminating glass such as Surlyn® to produce transparent armor, hurricane resistant windows and auto windshields. Absolute optical clarity is the goal for these laminating resins which are used in these optically critical applications such as windshields along with the maximum adhesion possible after laminating to glass to form the laminated product.

U.S. Pat. No. 3,404,134 to Rees, which is herein incorporated by reference, discloses un-neutralized ionomer copolymers that have been cross-linked with up to 73.6% by weight diamines and polyamines in a reactor which were not subject to extrusion. These ionomers were neutralized by alkaline earth and alkali metal cations. The cross-linking and neutralization can be practiced in an extruder according to the invention and provide an improved ionomer.

The preferred neutralizing agent is usually sodium hydroxide, lithium hydroxide or sodium carbonate for the preferred conversion to the sodium or lithium salt of the copolymer. This is accomplished by adding the sodium hydroxide or lithium hydroxide to the polymer pellets as a solid as it is fed into the extruder and the resulting heating and mixing is carried on in the extruder to produce strands of extruded partially neutralized ionomer which is chopped into pellet. This pellet material has a measured transmission in the range of 92-96% which is lower than the 98-100% which is desired. This pellet is then added to another extruder or re-extruded into sheet for laminating. This sheet material after the two extrusions has improved its transmission to about 96-98% which is the accepted maximum transmission by this procedure. The neutralization can actually be performed in the initial polymerization reactor by the careful addition of the neutralizing agent to the aqueous slurry of the freshly produced polymer powder still in the polymerization reactor and this material is stirred and heated until it has reacted. The partially neutralized ionomer powder is washed and dried and then extruded into pellet and then subsequently extruded again into optically clear tough laminating plastic sheet. This laminating sheet after lamination to glass produces a laminate with a transmission of 97-99% which is the highest in the industry and also has a very good impact resistance with a ball drop test. In the test, a 5 lb. steel ball is dropped from 28 inches to determine penetration when dropping.

SUMMARY OF THE INVENTION

The present invention relates to an apparatus and method for extruding thermoplastic polymers so as to prevent scorching and/or to dissolve additive through the use of steam in the extrusion apparatus.

More particularly, the method comprises the steps:
A) melting a thermoplastic polymer in an extrusion apparatus;
B) injecting an aqueous solution or steam sequentially into said extrusion apparatus so as to create high pressure steam;
C) subsequently venting the steam and then;
D) extruding the resulting polymer.

Advantageously, the polymer utilized is an ionomer and the process is utilized to admix cross-linking and/or neutralizing agents into the polymer as it is extruded.

Preferably, the extrusion apparatus is provided with multiple ports to inject either water or steam and an ejection port to remove the steam before extrusion from the apparatus.

It is a general object of the present invention to provide an apparatus and method for extruding a thermoplastic polymer so as to prevent scorching.

It is another object of the invention to extrude an ionomer to which a neutralizing agent is added.

It is yet another object of the invention to provide a method for extruding a sheet of ionomer having improved impact resistance, adhesion and optical transmission.

It is understood that the term "polymer" as used herein refers to thermoplastic polymers, copolymers and/or terpolymers having a melting point below 300° F.

The advantages and objects of the invention will be better understood from a reading of the preferred embodiments together with the drawings.

DESCRIPTION OF THE PREFERRED EMBODIMENTS

Figure 1:
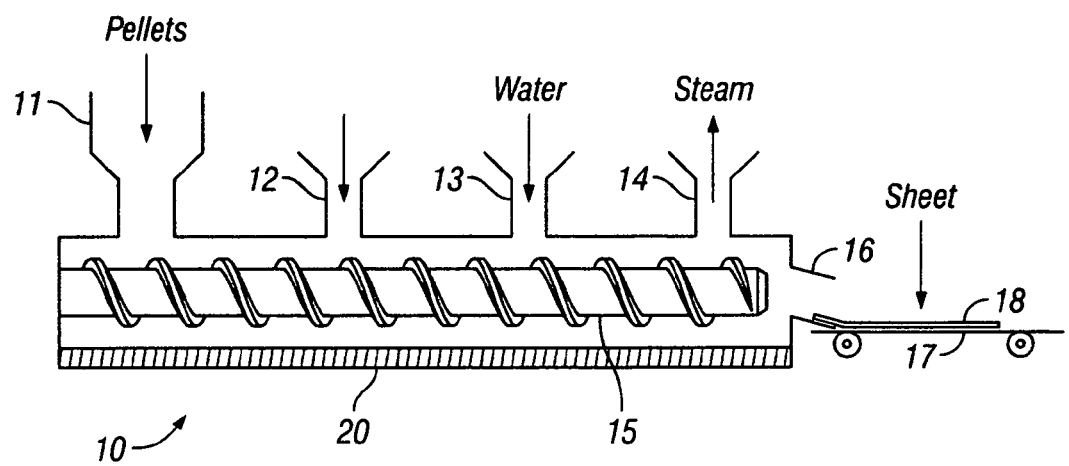
FIG. 1 is a schematic of an extruder of the invention which contains at least one water or steam injection port.

According to one embodiment of the invention there is provided a method and apparatus for extruding thermoplastic polymers so as to prevent scorching and to provide a better mixing of ingredients with the molten polymer when required.

More particularly, the method utilizes the steps of:

A) melting a thermoplastic polymer in a heated extrusion apparatus;

B) an aqueous solution or water or steam is sequentially added into the extrusion apparatus so as to create high pressure steam;

C) subsequently venting the steam, and then,

D) extruding the resulting polymer.

The apparatus can have one or more ports for injecting steam or an aqueous solution to create a high pressure steam having a temperature between 250-375° F.

The apparatus contains an entry port for the polymer and for the addition of an additive in solid form or as an aqueous solution so as to provide the water to initiate the formation of steam.

In accordance with a second embodiment of the invention there is extruded an ionomer sheet. According to this process, the steps are as follows:

1) ionomer pellets or powder are melted in the extruder. The ionomer may already be cross-linked or partially neutralized. If the ionomer needs to be cross-linked and/or neutralized, the cross-linking agent or the neutralizing agents is added with the powder or pellets or directly to the molten ionomer in the extruder. The additives may be in the form of a powder or an aqueous solution. If it is an aqueous solution, there is formed at the entry point of addition steam which aids the admixture and also cools hot spots in the extruder which may scorch the ionomer;

2) injecting water or steam at a temperature of about 250-300° F. through one or more ports downstream the initial entry port;

3) ejecting steam from the extruder prior to discharge of the extrudate;

4) extruding the resulting polymer from the apparatus.

The extrudate may be in the form of sheets or can be formed into pellets.

As illustrated in the drawing, a extruder (10) which has a screw (15) for moving and mixing a thermoplastic polymer has one or more water or steam injection ports (12, 13) position along the extruder (10). When an ionomer is to be neutralized or cross-linked, entry port (12) can be utilized to add a neutralizing agent into the extruder. In which case, there may be additional ports (13) to inject water or steam into the extruder. The steam is removed from one or more ports (14) before the polymer leaves the extruder (10) from the outlet (16) onto a conveyor (17) which transports the extrudate (18) from the extruder (10). The extrudate may be in sheet form for use in forming laminates, particularly for windows and windshields or to form molded ports.

It has been found that injecting aqueous solutions of sodium hydroxide, lithium hydroxide or any other neutralizing salt or reacting salt into the extruder achieves a very smooth reaction and a very high transmission of essentially 100% in a glass laminate. Additionally, the glass laminates also achieve improved ball drop tests of 9 or 10 which indicates no penetration of spall deflection of the laminate after impact. Laminates generally are in the range of about 0.065 to 0.095 for thicknesses of 3 mm. The inject point for the solution must be down the extruder several feet from where the pellet is added in order to have a molten polymer provide seal to contain the high pressure steam generated at the injection point by the aqueous solution of the sodium hydroxide or any other salt or base that is added. The high pressure steam acts as a plasticizer under these conditions promoting rapid and even reaction and mixing for the even neutralization of the polymer to form the well mixed homogeneous polymer. This total mixing and solubilization of all impurities does not occur by any other process for neutralizing these ionomer copolymers. The steam is subsequently vented further down the extruder barrel into a vacuum or vent port. The steam further prevents overheating and burnt spots occurring to the polymer product and further enhances the optical properties. The very thorough even mixing allows very good control of the neutralization such there are not over neutralized and under neutralized zones in the polymer. This gives rise to the improved impact resistance observed. This steam neutralization allows the polymer to be much more fluid under these conditions allowing for the rapid reaction with less retention time yet thorough reaction.

The injection of water to generate high pressure steam or high pressure steam itself can be used to improve the transmission of any thermoplastic or ionomer even though it has already been partially neutralized. This appears to be a general process for the improvement of the properties of thermoplastic polymers, especially ionomers.

Example 1

Partially neutralized Surlyn® 1707 resin (about 50% neutralized with LiOH) was added to the entry port of a small modified extruding apparatus (Welding Machine Co.) with a 3-in. extruder and a 16-inch die which maintained a temperature at 325-400° F. The extruding apparatus had a steam entry port which was followed by a steam exit port before discharge of the extrudate. A 50 to 60 mil film was extruded. The film had light transmission of about 97% and was free of any scorch marks.

Figure 2:
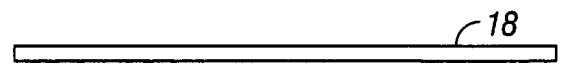
FIG. 2 is a perspective view of an ionomer sheet which may be used to form glass laminates.

The sheet was formed into security glass as seen in FIG. 2 and had a ball drop test score of 9-10.

Example 2

The same procedure of Example 1 was repeated with polyethylene acrylic acid (PrimaCore 59901 and 59801) which was mixed with a 50% solution of sodium hydroxide to obtain neutralization of about 40-50%. The apparatus was heated to 280° F. to form a melt. The sodium hydroxide solution formed steam and further steam was inserted downstream from the entry port. The extrudate was free of scorch marks and had a light transmission of about 96%.

Example 3

Polyurethane pellets were placed into the modified extruder of Example 1. The molten polyurethane was treated by injecting steam at 300° F. into the extruder and discharging the steam before the extrudate left the extruder. The extrudate formed a clear transparent film with no scorch marks.

What is claimed is:

1. A process for extruding polyolefin/acrylic, methacrylic, or polyurethane thermoplastic polymers to prevent scorching which comprises the steps of:

A) melting said thermoplastic polymer in an extrusion apparatus;

B) injecting an aqueous solution sequentially into said extrusion apparatus to create high pressure steam; such that the extruding and applying of stream are performed simultaneously C) subsequentially venting the steam, and then D) extruding the resulting polymer.

2. The process of claim 1 wherein said thermoplastic polymer is an ionomer.

3. The process of claim 1 wherein the aqueous solution of step B) is steam.

4. The process of claim 1 wherein step B) comprises adding an aqueous solution or steam through multiple spaced apart ports in said extrusion apparatus.

5. The process of claim 4 wherein steam is added at a temperature between about 250 and 300° F.

6. An extruded thermoplastic polymer prepared by the process of claim 1.

7. A process for preparing an improved partially neutralized ionomer which comprises the steps of:
   A) melting an ionomer in an extruder,
   B) injecting water or steam into the extruder so as to form high pressure steam;
   C) venting said steam from step B), and then
   D) extruding the resulting polymer formed,
   said ionomer being continuously mixed in said extruder.

8. The process of claim 7 wherein step B) is performed sequentially through multiple ports.

9. The process of claim 7 wherein in step D) the ionomer is extruded into sheets.

10. The process of claim 6 wherein the ionomer of step A) is partially neutralized with a salt of a cation selected from the group consisting of sodium potassium, lithium, magnesium and zinc.

11. The process of claim 10 wherein the salt is selected from the group consisting of sodium hydroxide and sodium carbonate.

12. The process of claim 7 wherein said steam is at a temperature of between 250 and 300° F.

13. The process of claim 7 wherein the ionomer in step D) is extruded into a sheet.

14. The process of claim 13 wherein said sheet has an optical transmission of 97-99%.

15. The process of claim 7 wherein the ionomer in step A) is neutralized with an aqueous solution containing a neutralizing agent prior to step B).

16. The process of claim 7 wherein the water injected in step B) is steam and injected at spaced apart ports.

17. An extruded ionomer prepared by the process of claim 7.

18. A process for preparing an improved partially neutralized ionomer which comprises the steps of:
   a) partially neutralizing an ionomer with a neutralizing salt selected from the group consisting of sodium, potassium, lithium, magnesium and zinc;
   b) introducing into a heated extruder the neutralized ionomer of step a);
   c) melting the ionomer in the extruder while continuously mixing;
   d) injecting water or steam into the extruder so as to form high pressure steam;
   e) venting said steam, and then
   f) extruding the resulting ionomer.

19. The process of claim 16 wherein said ionomer comprises a polyolefin/acrylic acid copolymer.

20. An extruded ionomer prepared by the process of claim 17.

* * * * *